(12) United States Patent
Schlienger

(10) Patent No.: US 6,279,485 B1
(45) Date of Patent: Aug. 28, 2001

(54) POD ASSEMBLY FOR LIGHT RAIL TRANSPORTATION

(75) Inventor: Max P. Schlienger, Ukiah, CA (US)

(73) Assignee: Flight Rail Corporation, Ukiah, CA (US)

( * ) Notice: Subject to any disclaimer, the term of this patent is extended or adjusted under 35 U.S.C. 154(b) by 0 days.

(21) Appl. No.: 09/411,626

(22) Filed: Oct. 1, 1999

(51) Int. Cl.$^7$ ....................................................... B61B 13/00
(52) U.S. Cl. ........................ 104/156; 104/139; 104/138.1
(58) Field of Search ............................. 104/138.1, 138.2, 104/139, 140, 145, 155, 156

(56) References Cited

U.S. PATENT DOCUMENTS

| | | | |
|---|---|---|---|
| 680,843 | * 8/1901 | Comstock | 104/156 |
| 2,606,725 | 8/1952 | Dreibelbis | 244/63 |
| 3,527,170 | 9/1970 | Witmer | 104/89 |
| 3,534,689 | 10/1970 | Barthalon | 104/89 |
| 3,543,685 | 12/1970 | Rosciszewski | 104/23 |
| 3,547,042 | 12/1970 | O'Connor | 104/155 |
| 3,565,011 | 2/1971 | Edwards | 104/138 |
| 3,648,620 | 3/1972 | Bertin et al. | 105/63 |
| 3,749,026 | 7/1973 | Carrasse | 104/156 |
| 3,774,542 | 11/1973 | Walsh | 104/89 |
| 3,837,285 | 9/1974 | Goering | 104/23 FS |
| 3,854,410 | 12/1974 | Crowder | 104/147 R |
| 3,930,450 | * 1/1976 | Symons | 104/139 |
| 4,102,272 | 7/1978 | Lehl et al. | 104/23 FS |
| 4,108,077 | 8/1978 | Laing | 104/156 |
| 4,166,419 | 9/1979 | Ardeleanu | 104/138 R |
| 4,202,272 | 5/1980 | Teodorescu et al. | 104/91 |
| 4,273,031 | 6/1981 | Hannon | 92/88 |
| 4,347,791 | 9/1982 | Mandros | 104/156 |
| 4,574,705 | * 3/1986 | Winckelmann | 104/156 |
| 4,587,906 | 5/1986 | Coester | 104/156 |
| 5,074,220 | 12/1991 | Petersen | 104/93 |
| 5,299,507 | 4/1994 | Maynard, Sr. | 104/138.1 |
| 5,460,098 | 10/1995 | Jackson et al. | 104/232 |
| 5,513,573 | 5/1996 | Sutton | 104/138.1 |
| 5,542,357 | 8/1996 | Gerhardt | 105/64.2 |
| 5,566,620 | 10/1996 | Siewert | 104/124 |
| 5,619,930 | 4/1997 | Alimanestiano | 104/138.1 |
| 5,669,308 | 9/1997 | Gerhardt | 104/155 |
| 5,791,255 | * 8/1998 | Box | 104/138.2 |

FOREIGN PATENT DOCUMENTS

| | | | |
|---|---|---|---|
| 27 50 916 | 5/1979 | (DE) | B61B/3/00 |
| 966602 | 10/1950 | (FR) . | |
| 6-179366 | 6/1994 | (JP) | B61B/13/12 |

* cited by examiner

Primary Examiner—Mark T. Le
(74) Attorney, Agent, or Firm—Townsend and Townsend and Crew LLP

(57) ABSTRACT

A pod assembly is disposed inside and thrusted along a slotted tube having a longitudinal slot. The pod assembly comprises a first pod, a second pod coupled with the first pod, and a strut disposed between and coupled with the first pod and the second pod. The strut extends through the longitudinal slot of the slotted tube to the support a transportation module outside the slotted tube. In one embodiment, the first pod is a thrust pod and the second pod is a passive pod. The thrust pod includes a thrust pod tire to make contact with the interior of the slotted tube and at least one bladder which is inflatable and deflatable to modulate gas flow through the thrust pod to adjust speed of movement of the thrust pod in the slotted tube. The passive pod includes a passive pod tire to make contact with the interior of the slotted tube and includes no thrust control feature. In another embodiment, the first and second pods include pod tires for making contact with the interior of the slotted tube. An adjustable mechanical valve such as a split butterfly valve is provided for modulating gas flow through the pod assembly to adjust the speed of movement of the pod assembly inside the slotted tube.

49 Claims, 7 Drawing Sheets

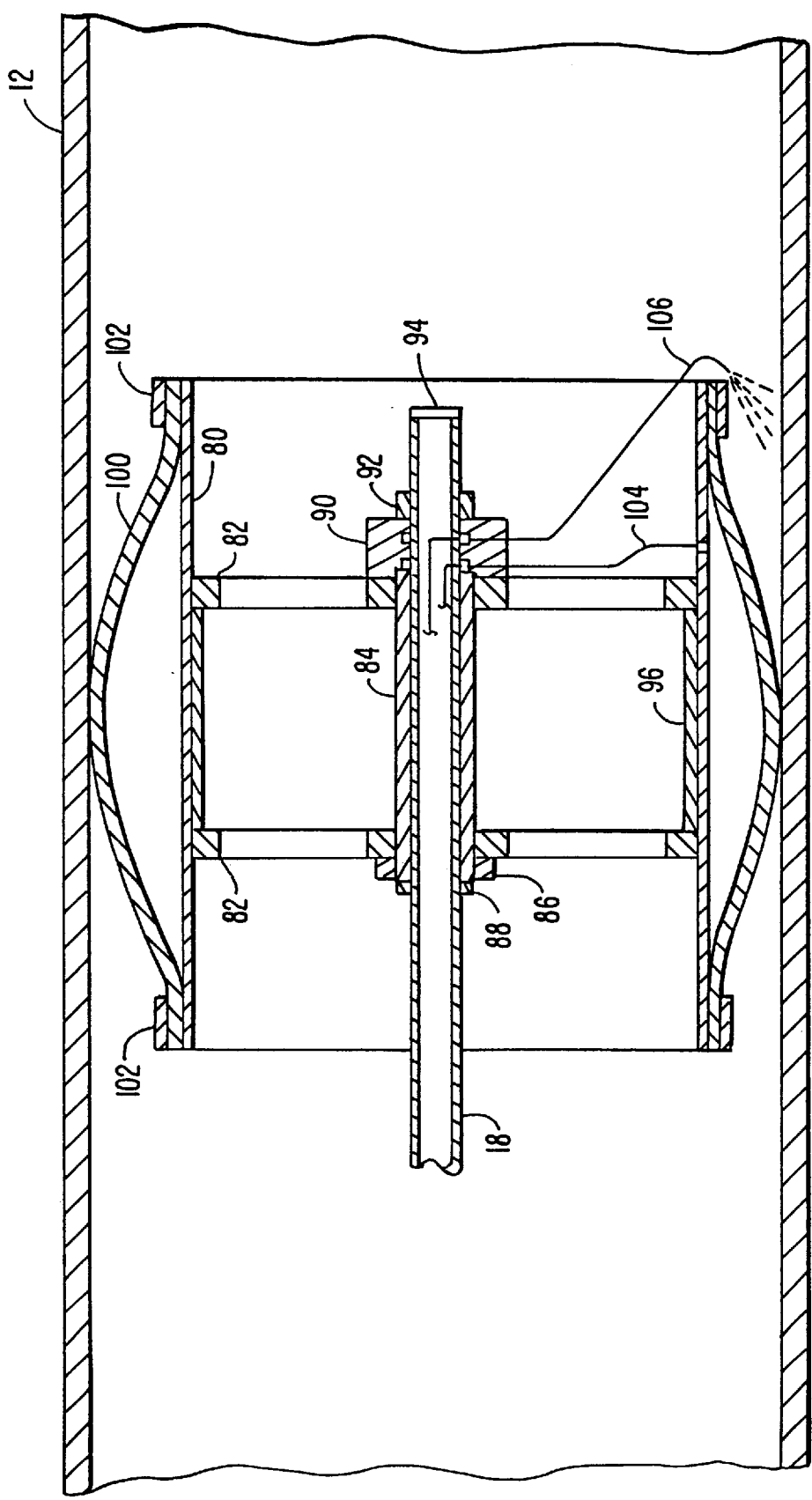

POD ASSEMBLY FOR LIGHT RAIL TRANSPORTATION

CROSS-REFERENCES TO RELATED APPLICATIONS

This application is related to concurrently filed and commonly assigned U.S. patent application, Ser. No. 09/411,790, entitled "Guideway System for Light Rail Transportation", which is incorporated herein by reference in its entirety.

BACKGROUND OF THE INVENTION

This invention relates to a transportation system and, more particularly, to a pod system for light rail transportation.

Rapid mass ground transportation systems offer many benefits over non-mass transportation means such as the use of automobiles, particularly in metropolitan areas experiencing severe traffic congestion and pollution problems. Mass ground transportation may also be a desirable alternative for short-range as well as long-range air travel. Although there has been a general recognition of the need for a reliable, safe rapid transportation system, utilization of rapid transit systems has been hindered by the high cost of construction and operation as well as technical difficulties in developing an efficient and versatile light rail system.

Conventional approaches have not produced a light rail transportation system that is sufficiently versatile, efficient, and cost-effective to be a feasible substitute for non-mass transportation and air travel alternatives. For instance, some so-called light rail systems have rather heavy transportation modules due to the use of heavy undercarriage or a heavy power system, high traction requirements, high onboard fuel requirements, or the like. Systems that rely on traction drives tend to have difficulty with steep grades. Moreover, external elements such as severe weather conditions and contaminations can pose substantial difficulty in the operation and maintenance of light rail systems. Additionally, traction drive mechanisms employing wheels tend to produce a lot of noise as well as wear.

SUMMARY OF THE INVENTION

The present invention overcomes the difficulties and disadvantages of the prior art by providing simple solutions to specific problems associated with developing an efficient and cost-effective light rail transportation system. The invention provides a drive system for a light rail vehicle, in the form of a pod assembly that does not depend on traction for moving the vehicle. In an embodiment, the pod assembly is placed inside a guide tube, the exterior of which preferably supports and guides the vehicle as it moves along the tube. Motion is generated by providing a pressure differential inside the tube between the upstream region and the downstream region of the pod assembly. The pressure differential is preferably generated by a stationary power system that produces a vacuum on the downstream region or pressurizes the upstream region or both. The speed of the pod assembly is controlled by modulating the amount of gas flow through the pod, that is, from the upstream side to the downstream side of the pod. The speed of the pod assembly is increased by reducing the amount of gas flow through the pod assembly to thereby increase the thrust on it, and is decreased by permitting a larger amount of gas to flow past the pod assembly to decrease the thrust. In a specific embodiment, the modulation is achieved by inflating and deflating one or more bladders. In another embodiment, a mechanical valve such as a split butterfly valve is used to control the gas flow through the pod assembly.

The pod assembly supports a transportation module or vehicle disposed above the guide tube. Because the thrust required to move the pod assembly is generated by stationary power systems, the vehicle does not require heavy on-board engines or drive trains. The pod assembly and guide tube are relatively light in weight and are well-suited for use in a light rail system. The guide tube can be elevated because of the light overall weight of the system, reducing right-of-way costs. When elevated, grading costs and requirements are significantly reduced.

In accordance with an aspect of the present invention, a pod assembly configured to be disposed inside and thrusted along a thrust tube comprises a thrust pod. The thrust pod comprises a thrust pod body including a generally cylindrical wall having a front end and a rear end. The thrust pod body is smaller in cross-section than the thrust tube. A portion of the front end is open and a portion of the rear end are open to allow gas flow through the thrust pod body between the front end and the rear end. A thrust pod tire is coupled with the generally cylindrical wall of the thrust pod body to define an outer annular enclosure between the thrust pod tire and the wall of the thrust pod body. The thrust pod tire is inflatable to make contact with the interior of the thrust tube and deflatable to open gas flow between the thrust pod body and the thrust tube. At least one bladder is disposed inside the thrust pod body. Each bladder is inflatable and deflatable to modulate gas flow through the thrust pod body to adjust speed of movement of the thrust pod body inside the thrust tube.

In a specific embodiment, the pod assembly includes a passive pod spaced from and coupled with the thrust pod. The passive pod comprises a passive pod body including a generally cylindrical wall having a front end and a rear end. The passive pod body is smaller in cross-section than the thrust tube. A portion of the front end is open and a portion of the rear end is open to allow gas flow through the passive pod body between the front end and the rear end. A passive pod tire is coupled with the generally cylindrical wall of the passive pod body to define an outer annular enclosure between the passive pod tire and the wall of the passive pod body. The passive pod tire is inflatable to make contact with the interior of the thrust tube and deflatable to open gas flow between the passive pod body and the thrust tube.

In accordance with another aspect of the invention, a pod assembly configured to be disposed inside and thrusted along a slotted tube having a longitudinal slot comprises a first pod and a second pod coupled with the first pod. A strut is disposed between the first pod and the second pod and coupled with the first pod and the second pod. The strut is configured to extend through the longitudinal slot of the slotted tube to the exterior of the slotted tube. In one embodiment, the first pod is a thrust pod and the second pod is a passive pod. In another embodiment, the pod assembly includes a valve which is adjustable to modulate gas flow through the pod assembly to adjust speed of movement of the pod assembly inside the slotted tube.

In accordance with another aspect of the present invention, a pod assembly configured to be disposed inside and thrusted along a thrust tube comprises a pod body including a generally cylindrical wall having a front end and a rear end. The pod body is smaller in cross-section than the thrust tube. A portion of the front end is open and a portion of the rear end is open to allow gas flow through the pod body between the front end and the rear end. At least one pod tire is coupled with the generally cylindrical wall of the pod body to define an outer annular enclosure between the pod tire and the wall of the pod body. The pod tire is inflatable to make contact with the interior of the thrust tube and deflatable to open gas flow between the pod body and the thrust tube. A valve is disposed at least partly inside the pod body and is adjustable to modulate gas flow through the pod body to adjust speed of movement of the pod body inside the thrust tube.

BRIEF DESCRIPTION OF THE DRAWINGS

FIG. 5 is a partial cross-sectional view of a passive pod in the pod assembly of FIG. 1;

DESCRIPTION OF THE SPECIFIC EMBODIMENTS

Figure 1:
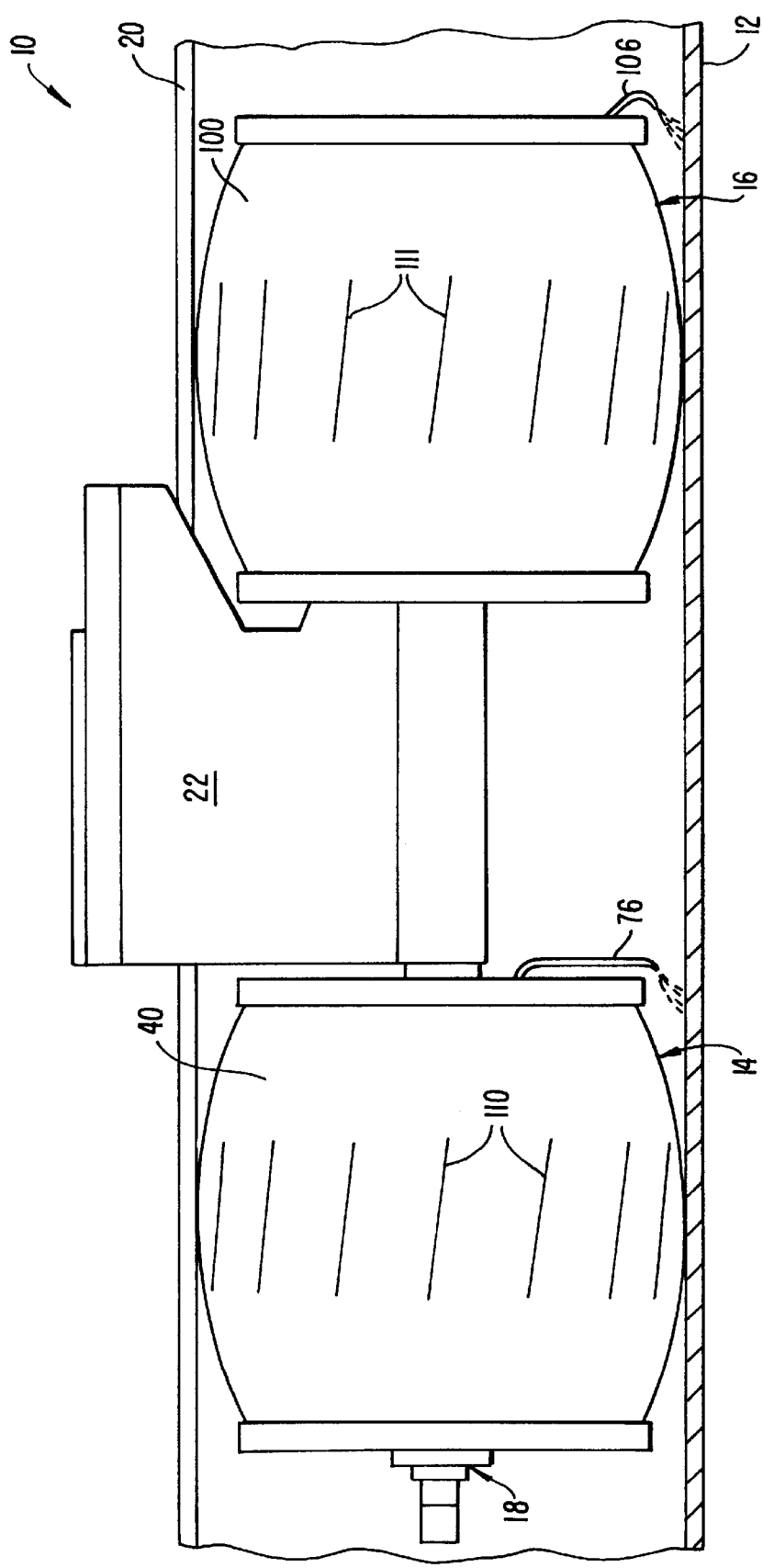
FIG. 1 is a partial cross-sectional view of a pod assembly disposed in a guide tube for supporting a transportation module in accordance with an embodiment of the present invention.
Figure 2:
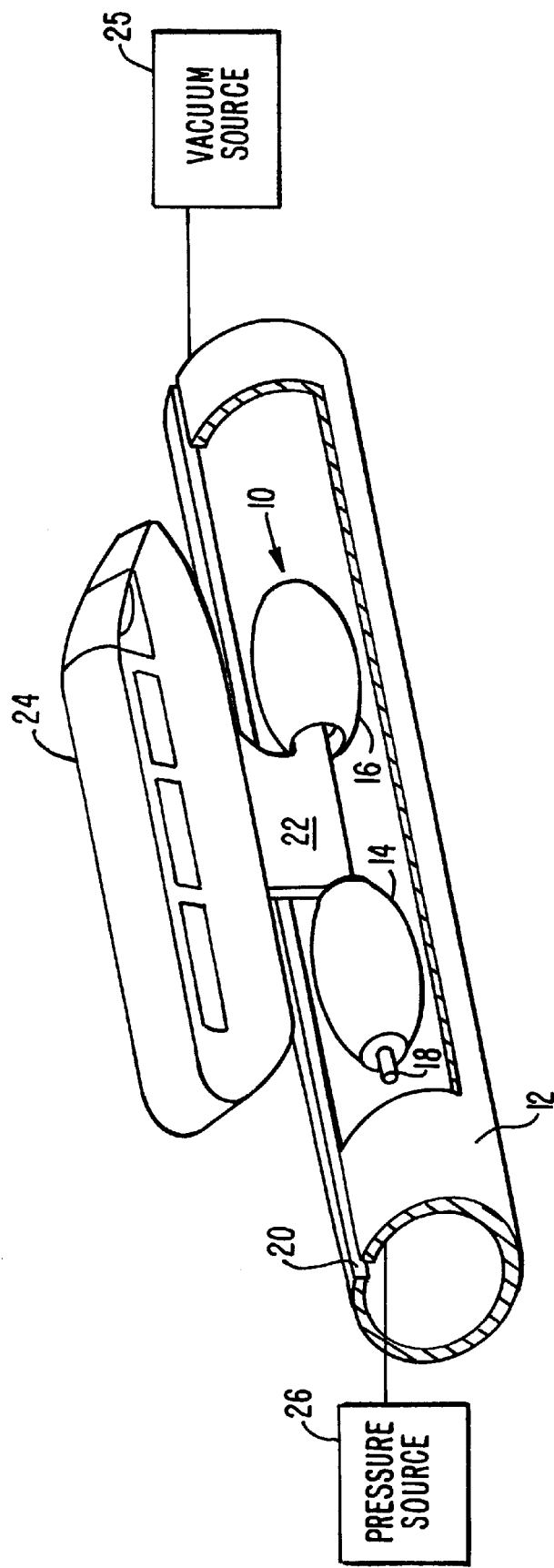
FIG. 2 is a perspective view with a cut-away portion of a guideway system illustrating a transportation module coupled with and supported by the pod assembly of FIG. 1.

FIG. 1 shows a pod assembly or otter assembly 10 disposed in a guide tube 12, which in this embodiment is a generally circular tube. The pod assembly 10 includes a thrust pod 14 and a passive pod 16 coupled together by a hollow shaft or axle 18 extending at least partially through the pistons or pods 14, 16. The guide tube 12 guides the pods 14, 16 for traveling therein. The guide tube 12 includes a longitudinal slot 20, as best seen in FIG. 2. A strut or pylon 22 is coupled to the pod assembly 10 and extends through the longitudinal slot 20 to connect with and support a transportation module or cargo unit 24 outside of the guide tube 12. The guide tube 12 is sealed at the ends and along the longitudinal slot 20 except where the strut 22 is disposed. A resilient sealing assembly allows the strut 22 to knife through the sealing assembly when the pod assembly 10 travels inside the guide tube 12 to thrust the strut 22 and transportation module 24 along the guide tube 12. The resilient sealing assembly returns to a sealing position to seal the guide tube 12 after the passing of the strut 22, thereby substantially sealing the guide tube 12 at the slot 20 forward and aft of the strut 22. An example of the resilient sealing assembly is disclosed in copending patent application, Ser. No. 09/411,790.

FIG. 2 shows a vacuum source 25 coupled with the downstream side of the pod assembly 10 and a pressure source 26 coupled with the upstream side of the pod assembly 10. Either or both of the vacuum source 25 and the pressure source 26 can produce pressure differential between the upstream region and the downstream region of the pod assembly 10 to drive the pod assembly along the length of the guide tube 12.

Figure 3:
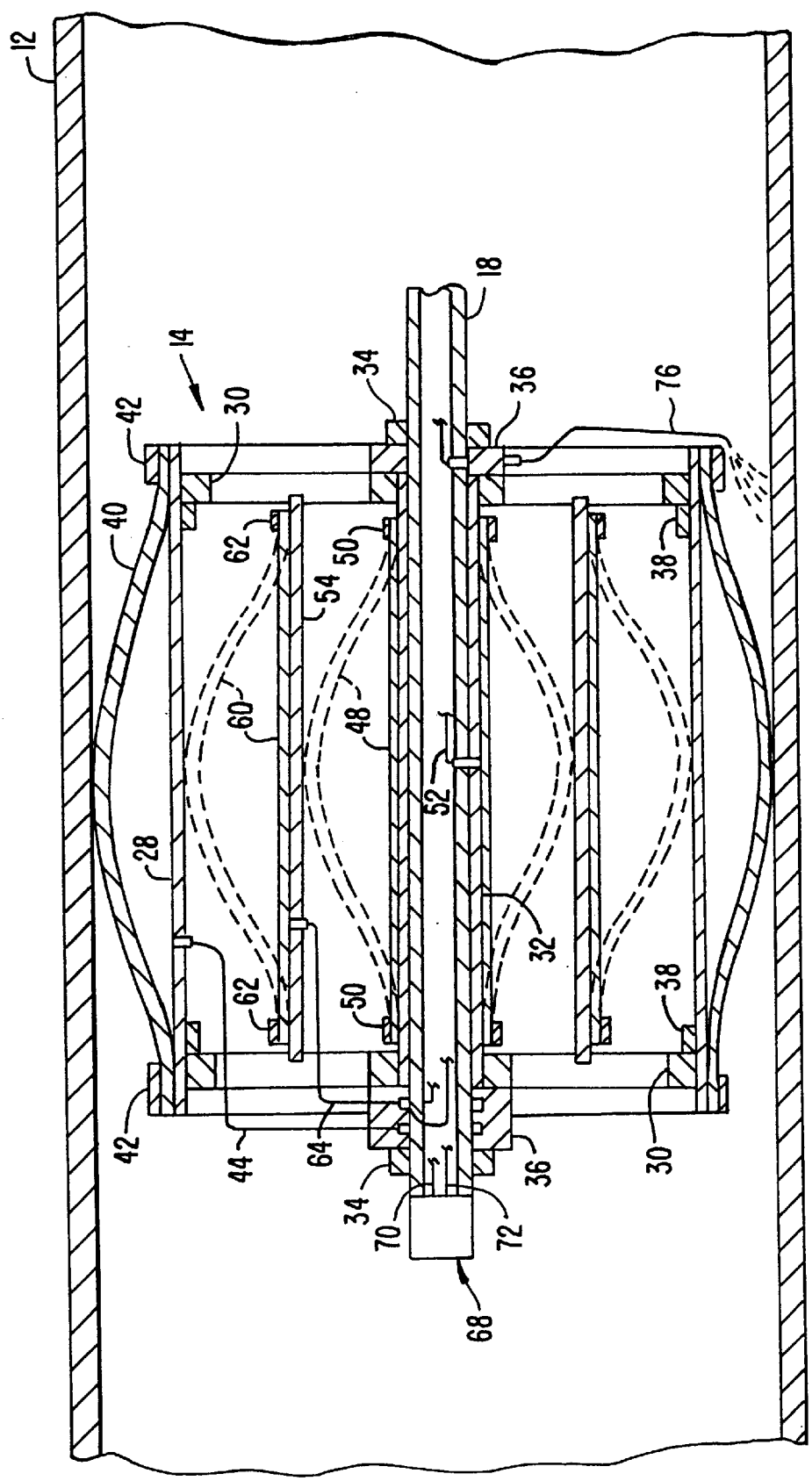
FIG. 3 is a partial cross-sectional view of a thrust pod in the pod assembly of FIG. 1.
Figure 4:
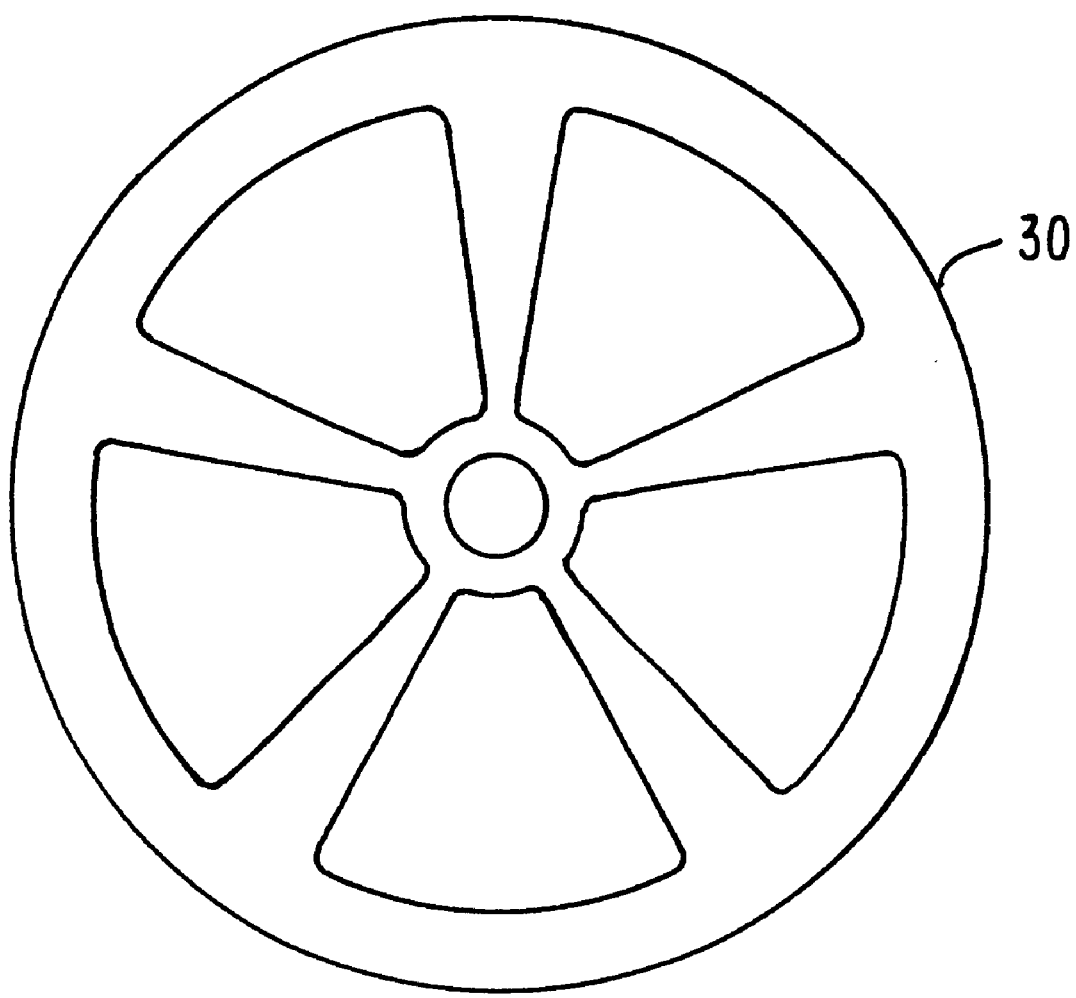
FIG. 4 is an elevational view of a hub in the thrust pod of FIG. 3.

The detailed structure of the thrust pod 14 is shown in FIG. 3. The thrust pod 14 includes a generally cylindrical wall 28 having a front end and a rear end. In this embodiment, the cylindrical wall 28 is generally circular and has a smaller diameter than the interior of the guide tube 12. The axle 18 extends along the axis of the cylindrical wall 28, and is connected with the cylindrical wall 28 by a pair of hubs 30 at the front end and rear end, respectively, of the wall 28. As best seen in FIG. 4, the hubs 30 include openings that allow gas to flow between the front end and the rear end of the cylindrical wall 28. A thrust tubular member 32 is desirably disposed between the axle 18 and the hubs 30. The thrust tubular member 32 surrounds the axle 18 and is locked onto the axle 18 by a pair of clamps 34, which also serve as thrust bearings. A pair of rotating seal and bearing assemblies 36 connect the two hubs 30, respectively, with the thrust tubular member 32, so that the hubs 30 together with cylindrical wall 28 are rotatable relative to the thrust tubular member 32 and axle 18 while maintaining a sealed connection therebetween. The thrust tubular member 32 and axle 18 are generally nonrotating members. A pair of rings 38 attached to the cylindrical wall 28 are used to locate the hubs 30 relative to the cylindrical wall 28. The hubs 30 may be attached to the rings 38 using bolts or the like.

A pod tire 40 is secured to the exterior of the cylindrical wall 28 by a pair of tire clamps 42 disposed at the two ends of the wall 28. The tire clamps 42 seal the connection, thereby forming an airtight cavity or enclosure between the pod tire 40 and the cylindrical wall 28. The enclosure is expandable with pressurized air or gas supplied through a gas line 44 connected through the thrust tubular member 32 and the hollow axle 18 to a gas source. The gas line 44 is coupled to the thrust tubular member 32 and hollow axle 18 through the rotary seal and bearings assembly 36 to ensure proper gas connection and control even when the cylindrical wall 28 and hubs 30 rotate relative to the thrust tubular member 32 and axle 18. FIG. 3 shows the pod tire 40 in an inflated state in contact with the guide tube 12, desirably in an approximately tangential manner. The pod tire 40 preferably has a smooth surface for making contact with the guide tube 12. The pressure in the enclosure can be adjusted remotely by controlling the gas flow through the gas line 44, for instance, from the transportation module 24.

A membrane or bladder 48 is coupled to the exterior of the thrust tubular member 32 by a pair of bladder clamps 50 disposed near the two hubs 30, respectively. The bladder clamps 50 seal the connection to provide an airtight cavity or enclosure between the bladder 48 and the thrust tubular member 32. The enclosure is expandable by air or gas supplied via a gas line 52 extending through the thrust tubular member 32 and the hollow axle 18 to a gas source which is typically controlled remotely from the transportation module 24. In FIG. 3, the deflated position of the bladder 48 is shown in solid lines, while the inflated position is depicted in broken lines. In the inflated position, the bladder 48 is in contact with an inner tubular housing 54 to block gas flow through the portion of the thrust pod 14 between the thrust tubular member 32 and the inner tubular housing 54. The inner tubular housing 54 is coupled with and supported by the hubs 30. In the embodiment shown, the inner tubular housing 54 is received into grooves or slots in the hubs 30.

Another bladder 60 is coupled to the exterior of the inner tubular housing 54 by a pair of bladder clamps 62 disposed near the hubs 30, respectively. The bladder clamps 62 seal the connection to provide an airtight cavity or enclosure between the outer bladder 60 and the inner tubular housing 54. The enclosure is expandable by air or gas supplied through a gas line 64 connected through the thrust tubular member 32 and the hollow axle 18 to a gas source. The pressure in the enclosure is typically adjusted remotely by controlling the gas flow through the gas line 64 from the transportation module 24. The gas line 64 is coupled to the thrust tubular member 32 and hollow axle 18 through the rotary seal and bearings assembly 36 to ensure proper gas connection and control even when the cylindrical wall 28 and hubs 30 rotate relative to the axle 18. In FIG. 3, the deflated position of the outer bladder 60 is shown in solid lines, while the inflated position is depicted in broken lines. In the inflated position, the outer bladder 60 comes into contact with the cylindrical wall 28 to block gas flow through the portion of the thrust pod 14 between the inner tubular housing 54 and the cylindrical wall 28.

A head assembly 68 is desirably mounted to the front of the thrust pod assembly 14 to provide lights, camera, and the like. In the embodiment shown in FIG. 3, the head assembly 68 is attached to the front end of the nonrotating axle 18 and seals the front end. A video cable 70 is coupled between the camera in the head assembly 68 and a video receiver in the transportation module 24 for monitoring conditions in the guide tube 12. A power cable 72 provides power to the head assembly 68.

The thrust pod assembly 14 desirably includes a water line 76 supplying water for spraying onto the exterior of the pod tire 40, as illustrated in FIG. 3. The water line 76 extends through the rotary seal 36 and axle 18 to a water source. The water line 76 is coupled to the water source through the rotary seal and bearings assembly 36 to ensure proper gas connection and control even when the cylindrical wall 28 and hubs 30 rotate relative to the axle 18. The water source is typically carried on board the transportation module. The water spray provides a lubricant layer between the pod tire 40 and the guide tube 12 that can lead to a hydroplaning effect between the pod tire 40 and guide tube 12 which can significantly reduce friction. It is noted that other fluids may be used instead of water The pod tire 40 is made of a low friction material such as Teflon, and is inflated to provide a very small circumferential clearance between the pod tire 40 and the guide tube 12 to minimize air leakage past it while minimizing friction between it and the guide tube wall.

As illustrated in FIG. 5, the passive pod 16 includes a generally cylindrical wall 80 having a front end and a rear end. In this embodiment, the cylindrical wall 80 is generally circular and smaller in diameter than the interior of the guide tube 12. The cylindrical wall 80 is substantially identical to the cylindrical wall 28 of the thrust pod assembly 14 in a specific embodiment. The axle 18 extends along the axis of the cylindrical wall 80, and is connected with the cylindrical wall by a pair of hubs 82 which are inboard hubs disposed inward from the front and rear ends of the wall 80, respectively. The hubs 82 include openings through which gas can flow between the front end and the rear end of the cylindrical wall 80. In one embodiment, the hubs 82 are substantially identical to the hubs 30 in the thrust pod assembly 14 as shown in FIG. 4.

A passive tubular member 84 is desirably disposed between the axle 18 and the hubs 82, as illustrated in FIG. 5. The passive tubular member 84 surrounds the axle 18. The tubular member 84 is rotatable on the axle 18 near one end by a removable collar 86 and clamp and bearing 88, and near the other end by a rotary seal and bearing 90 and clamp and thrust bearing 92. The connection allows the hubs 82 and cylindrical wall 80 to rotate relative to the axle 18 while maintaining a sealed connection therebetween. The end of the axle 18 is sealed with a sealing plug 94. A ring 96 is attached to the interior surface of the cylindrical wall 80 to locate the hubs 82 relative to the cylindrical wall 80. The hubs 82 may be attached to the ring 96 using bolts or the like. The passive pod 16 includes no thrust control features.

A passive pod tire 100 is coupled to the exterior of the cylindrical wall 80 by a pair of tire clamps 102 disposed at the two ends of the wall 80, respectively. The tire clamps 82 seal the connection to provide an airtight cavity or enclosure between the pod tire 100 and the cylindrical wall 80. The enclosure is expandable by air or gas supplied through a gas line 104 connected through the passive tubular member 84 and the hollow axle 18 to a gas source. The gas line 104 is coupled to the hollow axle 18 through the rotary seal and bearings assembly 90 to ensure proper gas connection and control even when the cylindrical wall 80 and hubs 82 rotate relative to the axle 18. FIG. 5 shows the pod tire 100 in an inflated state in contact with the guide tube 12. The pod tire 100 preferably has a smooth surface for making contact with the guide tube 12, and may be substantially identical to the pod tire 40 of the thrust pod assembly 14. The pressure in the enclosure is typically adjusted remotely by controlling the gas flow through the gas line 104 from the transportation module 24.

As shown in FIG. 5, the passive pod assembly 16 desirably includes a water line 106 supplying water for spraying to the pressure side of the pod tire 100, which is similar to the water line 76 used for the thrust pod assembly 14. The water line 106 extends through the rotary seal 36 and axle 18 to a water source. The water line 106 is coupled to the water source through the rotary seal and bearings assembly 90 to ensure proper gas connection and control even when the cylindrical wall 80 and hubs 82 rotate relative to the axle 18. The water spray provides a lubricant between the pod tire 100 and the guide tube 12, and may produce a hydroplaning effect between the pod tire 100 and guide tube 12. The pod tire 100 is inflated to provide a very small circumferential clearance between the pod tire 100 and the guide tube 12.

The radii of curvature of the thrust pod tire 40 and passive pod tire 100 in the embodiment shown are generally equal to the inner diameter of the guide tube 12. Of course, the radii of curvature may vary depending on physical factors required for specific transportation modules and terrain requirements. The small circumferential clearance between the thrust pod tire 40 and the guide tube 12 and the small clearance between the passive pod tire 100 and the guide tube 12 provide leakage of small amounts of gas around the thrust pod 14 and passive pod 16. This produces a venturi effect which tends to center the pods 14, 16 in the guide tube 12. Moreover, the rotation of the pods 14, 16 inside the guide tube 12 produces more even wear of the pod tires 40, 100. As shown in FIG. 1, rotational treads 110, 111 are provided on the external surfaces of the pod tires 40, 100 to cause rotation of the pods 14, 16 as they move inside the guide tube 12. The rotational treads 110, 111 are slanted slightly to provide slow rotation in the embodiment shown.

Figure 7:
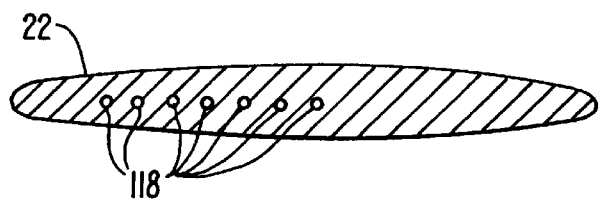
FIG. 7 is a cross-sectional view of the strut of FIG. 6 along line I—I.
Figure 6:
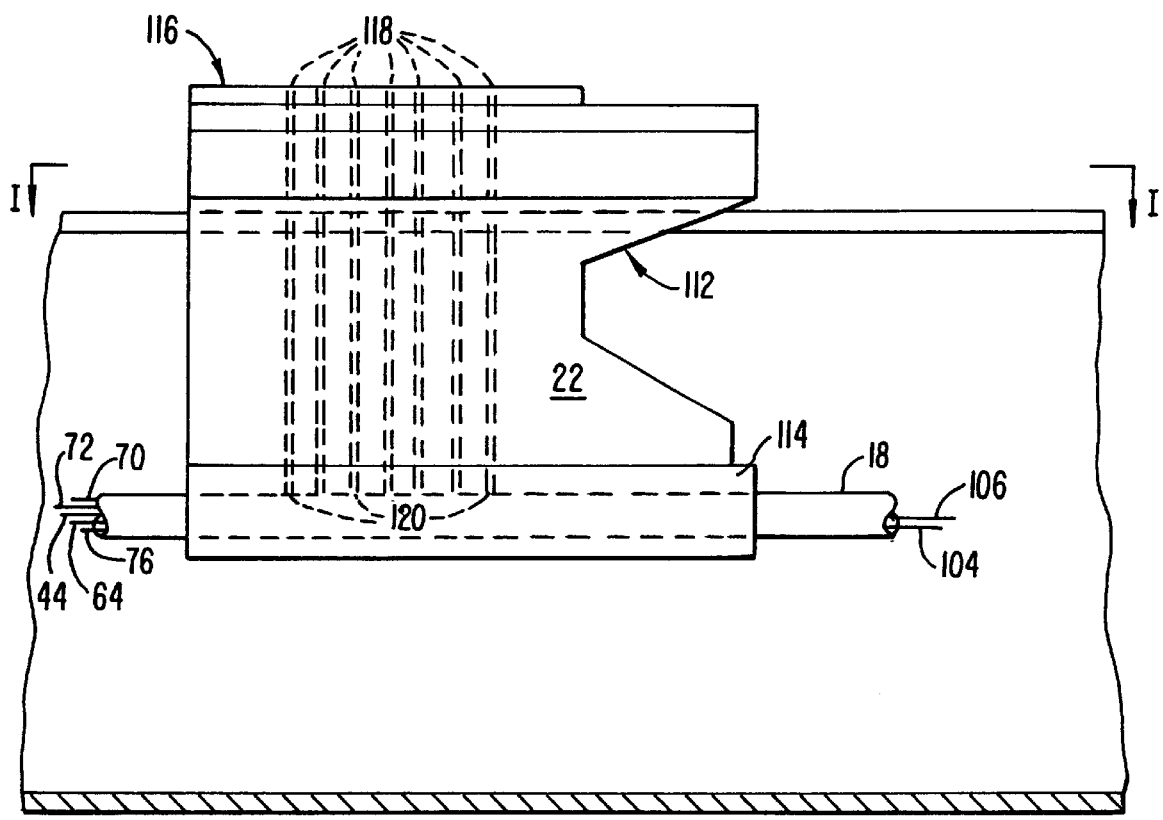
FIG. 6 is an elevational view of a strut for coupling the pod assembly with the transportation module of FIG. 2.

The strut 22 of FIG. 6 includes an axle housing 114 at a lower end which is locked onto the axle 18 to prevent rotational and axial movement of the strut 22 relative to the axle 18. In a specific embodiment, the axle housing 114 can be split into two portions along the centerline of the axle 18. The two portions are easily assembled around the axle 18 and are attached together by bolting, clamping, or the like. The strut 22 has a mounting flange 116 at an upper end disposed outside the guide tube 12 for mounting to the transportation module 24. FIG. 7 shows a cross-sectional view of the upper portion of the strut 22. The strut 22 desirably has a pronounced notch 112 which allows the lower portion of the strut 22 to be received partly into the open interior of the passive pod 16 provided by the inboard hubs 82 (see FIGS. 1 and 5). This allows the overall pod assembly 10 to be shortened.

The strut 22 preferably includes a plurality of control and service conduits 118 extending from the upper end to the lower end and being coupled with corresponding apertures 120 in the axle 18 for accommodating various wires, cables, and lines. For instance, as shown in FIG. 6, extending from the conduits 118 and apertures 120 to the thrust pod 14 are the gas lines 44, 64, the video cable 70, the power cable 72, and the water line 76, and extending from to the passive pod 16 are the gas line 104 and water line 106. Some or all of these lines and cables extend from the strut 22 to the transportation module 24 where the sources and controls are located. The control and service conduits 118 conveniently allow all the controls and service features to be provided from the exterior of the guide tube 12 typically from the transportation module 24.

The pod assembly 10 is desirably made of light-weight, high-strength materials such as titanium, aluminum, high performance steels, and plastic materials. The combination of the thrust pod 14 and the passive pod 16 provides a stable support for the strut 22 and transportation module 24. Additional pods may be added for a larger or longer transportation module. For example, additional passive pods may be added to lengthen the pod assembly for supporting a longer transportation module.

In operation, the right side or upstream side of the pod assembly 10 is subjected to a higher pressure than the downstream side or left side by drawing a vacuum. on the left side using the vacuum source 25, or pumping a gas into the right side using the pressure source 26, or both. The first bladder 48 and second bladder 60 of the thrust pod 14 are inflatable by gas through the gas line 44 and the gas line 64, respectively. The bladders 48, 60 are inflated to varying degrees to modulate gas passage through the pod assembly 10 and adjust the speed of pod assembly 10. In the fully inflated state, the bladders 48, 60 substantially block gas flow between the upstream and downstream sides of the pod assembly 10, resulting in maximum thrust of the pod assembly 10 in the guide tube 12. Water from the water line 106 lubricates the contact region between the thrust pod tire 82 and the guide tube 12. The contact region between the passive pod tire 100 of the passive pod 16 is also lubricated by water from the water line 106. The treads 110, 111 on the exterior of the pod tires 40, 100 cause the thrust pod 14 and passive pod 16 to rotate for more even wear.

Figure 8:
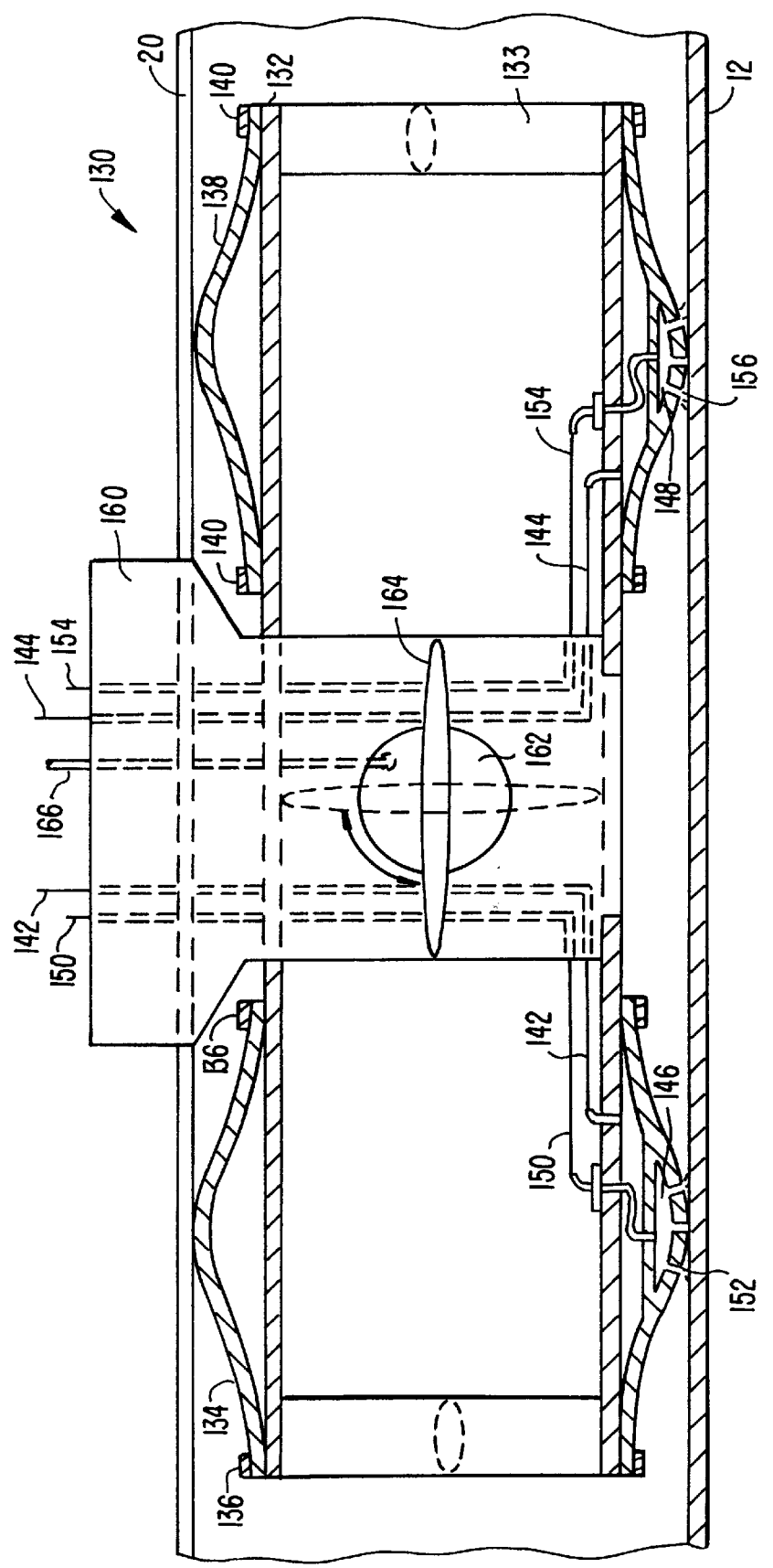
FIG. 8 is a partial cross-sectional view of a pod assembly disposed in a guide tube for supporting a transportation module in accordance with another embodiment of the invention.

FIG. 8 shows another embodiment of the pod assembly 130 employing a different thrust control mechanism from that in the pod assembly 10 of FIG. 1. The pod assembly 130 includes a pod body 132 which is typically circular cylindrical with a smaller diameter than that of the guide tube 12. Disposed near the front end and the rear end of the pod body 132 are a pair of spokes 133, respectively, which support the pod body 132 and maintain its shape. The spokes 133 are desirably streamlined to minimize impedance to air flow through the interior of the pod body 132, which is particularly important during low thrust situations. A front pod tire 134 is coupled to the exterior of the front portion of the pod body 132 by a pair of front tire clamps 136, and a rear pod tire 138 is coupled to the exterior of the rear portion of the pod body 132 by a pair of rear tire clamps 140. The front and rear tire clamps 136, 140 seal the connections to provide airtight cavities or enclosures between the front pod tire 134 and the pod body 132 and between the rear pod tire 138 and the pod body, respectively. The enclosures are expandable by air or gas supplied through a front gas line 142 and a rear gas line 144, respectively, which are coupled to a gas source. FIG. 8 shows the pod tires 134, 138 in inflated states in contact with the guide tube 12. The pod tires 134, 138 preferably have smooth surfaces for making contact with the guide tube 12, and may be substantially identical to one another. The pressures in the pod tire enclosures are typically adjusted remotely by controlling the gas flow through the gas lines 142, 144, respectively, from the transportation module 24. The gas in the pod tires 134, 138 has a low viscosity which allows the tires to conform readily to slight changes in the cross-section of the guide tube 12 (e.g., variations up to about 2% of the nominal diameter of the guide tube 12).

The front pod tire 134 has a front plenum chamber 146 near its bottom and the rear pod tire 138 has a rear plenum chamber 148 near its bottom. The front plenum chamber 146 contains water which is pressurized by a front water line 150 enabling water to flow through small orifices 152 in the front pod tire 134 when the water pressure therein exceeds the pressure load on the front pod tire 134. Similarly, the rear plenum chamber 148 contains water which is pressurized by a rear water line 154 enabling water flow through small orifices 156 in the rear pod tire 138 when the water pressure therein exceeds the pressure load on the rear pod tire 138. The pod tires 134, 138 preferably have smooth surfaces. The small quantities of escaping water from the plenum chambers 146, 148 acts as a lubricant between the pod tires 134, 138 and the guide tube 12. The water produces an effect similar to a hydrostatic bearing, and can cause a hydroplaning effect between the pod tires 134, 138 and the guide tube 12 when the pod tires 134, 138 move relative to the guide tube 12. The water also acts as a coolant for heat produced by friction between the pod tires 134, 138 and the guide tube 12. It is noted that the water plenum chambers 146, 148 may be annular chambers extending around the pod tires 134, 138 in another embodiment. In addition, it may be advantageous to replace the water in the plenum chambers 146, 148 with a higher or lower pressure gas or air to effect more or less contact area on the crown of the pod tires 134, 138, respectively, thereby increasing or decreasing friction for speeding up or slowing down the pod assembly 130, respectively.

A strut 160 is disposed between the two pod tires 134, 138, and extends into the interior of the pod body 132. As illustrated in FIG. 8, the strut 160 extends generally vertically across a plane of symmetry of the pod body 132 and is diametrically fixed therein. The strut 160 includes a hub 162 disposed therein. A split butterfly valve 164 is attached to the hub 162 and rotates with rotation of the hub 162. The rotation of the hub 162 is controlled by manipulating a rod 166 which is connected with the hub 162 using appropriate bearings to enable the actuation of the rod 166 to cause the hub 162 to rotate. FIG. 8 shows the split butterfly valve 164 in a fully open position providing minimum thrust. The fully closed position providing maximum thrust of the split butterfly valve 164 is illustrated with broken lines.

In the embodiment shown in FIG. 8, the pod assembly 130 is thrusted by the pressure differential that exists between the upstream and downstream regions of the pod assembly 130. The pressure differential can be created by drawing a vacuum in the guide tube 12 on the downstream side of the pod assembly 130, pressurizing the tube 12 on the upstream side of the pod assembly 130, or both. The speed of the pod assembly 130 is controlled by adjusting the position of the split butterfly valve 164 to modulate the gas flow through the pod assembly 130. Maximum thrust is achieved by closing the valve 164 by moving it to the generally vertical position shown in broken lines in FIG. 8. The pod assembly 130 is typically made of light-weight, high-strength materials. Additional pod tires may be added to lengthen the pod assembly for supporting a longer transportation module when needed.

The pod assemblies according to the present invention are well-suited for use in a light rail transportation system. Because the thrust required to move the pod assembly is generated by stationary power systems, the transportation system does not require heavy engines or drive trains. The low onboard fuel requirements and light-weight power system, coupled with the elimination of heavy undercarriage and traction requirement, allow the weight of the transportation module to be minimized. Further, because the transportation system does not depend on traction for movement, it can follow terrain better and, with sufficient thrust from the pressure differential between the front and rear ends of the pod assembly, can negotiate grades of 15% or higher. The stationary power system can be refueled more frequently, and can be powered readily by a variety of energy sources such as electricity, propane, natural gas, diesel, gasoline, kerosene, and hydrogen. Locating the pod assembly below the transportation module produces a low center of gravity which is advantageous in minimizing track and positive restraint systems. The guide tube can be elevated because of the light overall weight of the system, reducing right-of-way costs. When elevated, minimum grading requirements are needed.

The above-described arrangements of apparatus and methods are merely illustrative of applications of the principles of this invention and many other embodiments and modifications may be made without departing from the spirit and scope of the invention as defined in the claims. For instance, the shapes of the pods and guide tube may be noncircular. The number of pods and bladders may be higher or lower.

What is claimed is:

1. A pod assembly configured to be disposed inside and thrusted along a thrust tube, the pod assembly comprising a thrust pod which comprises:
   a thrust pod body including a generally cylindrical wall having a front end and a rear end, the thrust pod body being smaller in cross-section than the thrust tube, a portion of the front end being open and a portion of the rear end being open to allow gas flow through the thrust pod body between the front end and the rear end;
   a thrust pod tire coupled with the generally cylindrical wall of the thrust pod body to define an outer annular enclosure between the thrust pod tire and the wall of the thrust pod body, the thrust pod tire being inflatable to make contact with the interior of the thrust tube and deflatable to open gas flow between the thrust pod body and the thrust tube; and
   at least one bladder disposed inside the thrust pod body, the bladder being inflatable and deflatable to modulate gas flow through the thrust pod body to adjust speed of movement of the thrust pod body inside the thrust tube.

2. The pod assembly of claim 1 wherein the thrust pod further comprises a thrust tubular member extending through the interior of the thrust pod body and being coupled with the thrust pod body.

3. The pod assembly of claim 2 wherein the at least one bladder includes a first bladder which is coupled with a portion of the thrust tubular member to define a first annular enclosure between the first bladder and the thrust tubular member.

4. The pod assembly of claim 3 wherein the first bladder is inflatable to make contact with the interior of the generally cylindrical wall of the thrust pod body to at least substantially block gas flow between the thrust tubular member and the thrust pod body, and wherein the first bladder is deflatable to open gas flow between the thrust tubular member and the thrust pod body.

5. The pod assembly of claim 3 wherein the thrust pod further comprises an inner housing disposed inside and coupled with the thrust pod body, the inner housing having a generally cylindrical wall disposed between the thrust tubular member and the thrust pod body and spaced from the thrust tubular member and the thrust pod body, wherein the first bladder is inflatable to make contact with the interior of the generally cylindrical wall of the inner housing to at least substantially block gas flow between the thrust tubular member and the inner housing, and wherein the first bladder is deflatable to open gas flow between the thrust tubular member and the inner housing.

6. The pod assembly of claim 5 wherein the at least one bladder includes a second bladder which is coupled with a portion of the inner housing to define a second annular enclosure between the second bladder and the inner housing.

7. The pod assembly of claim 6 wherein the second bladder is inflatable to make contact with the interior of the generally cylindrical wall of the thrust pod body to at least substantially block gas flow between the inner housing and the thrust pod body, and wherein the second bladder is deflatable to open gas flow between the inner housing and the thrust pod body.

8. The pod assembly of claim 6 wherein the thrust pod further comprises a gas line coupled from a gas source to the second annular enclosure between the second bladder and the inner housing for gas flow between the gas source and the second annular enclosure.

9. The pod assembly of claim 3 wherein the first bladder is clamped and sealed with the exterior of the thrust tubular member at one end near the front end of the thrust pod body and at another end near the rear end of the thrust pod body.

10. The pod assembly of claim 3 wherein the thrust pod further comprises a gas line coupled from a gas source to the outer annular enclosure between the thrust pod tire and the wall of the thrust pod body for gas flow between the gas source and the outer annular enclosure.

11. The pod assembly of claim 3 wherein the thrust pod further comprises a gas line coupled from a gas source to the first annular enclosure between the first bladder and the thrust tubular member for gas flow between the gas source and the first annular enclosure.

12. The pod assembly of claim 2 wherein the thrust pod further comprises a front hub coupled with the front end of the thrust pod body and the thrust tubular member, and a rear hub coupled with the rear end of the thrust pod body and the thrust tubular member, the front hub and rear hub each including at least one opening to permit gas flow therethrough.

13. The pod assembly of claim 12 wherein the front hub and the rear hub each comprise an annular plate having a plurality of openings.

14. The pod assembly of claim 2 wherein the thrust tubular member is generally coaxial with the thrust pod body.

15. The pod assembly of claim 2 further comprising an axle extending through at least a portion of the interior of the thrust tubular member, the thrust tubular member being rotatable relative to the axle and being generally fixed relative to the axle in an axial direction along the axis of the axle.

16. The pod assembly of claim 15 further comprising a second pod spaced from the thrust pod and coupled with the axle.

17. The pod assembly of claim 15 wherein the axle is coupled with the thrust tubular member by at least one rotating seal and bearing assembly.

18. The pod assembly of claim 1 wherein the thrust pod further comprises a fluid line coupled to a fluid source for introducing a fluid between the interior of the thrust tube and the exterior of the thrust pod tire.

19. The pod assembly of claim 1 wherein the thrust pod tire includes at least one tread on the exterior surface of the thrust pod tire, the at least one tread being slanted with respect to a longitudinal direction of movement of the thrust pod for guiding the thrust pod tire in rotation relative to the thrust tube when the thrust pod tire moves inside the thrust tube.

20. The pod assembly of claim 19 wherein the at least one tread is slightly slanted with respect to the longitudinal direction to guide the thrust pod tire in slow rotation relative to the thrust tube.

21. The pod assembly of claim 1 wherein the thrust pod tire is inflatable to make contact with the interior of the thrust tube in a generally tangential manner.

22. The pod assembly of claim 1 further comprising a passive pod spaced from and coupled with the thrust pod, the passive pod comprising:
a passive pod body including a generally cylindrical wall having a front end and a rear end, the passive pod body being smaller in cross-section than the thrust tube, a portion of the front end being open and a portion of the rear end being open to allow gas flow through the passive pod body between the front end and the rear end; and
a passive pod tire coupled with the generally cylindrical wall of the passive pod body to define an outer annular enclosure between the passive pod tire and the wall of the passive pod body, the passive pod tire being inflatable to make contact with the interior of the thrust tube and deflatable to open gas flow between the passive pod body and the thrust tube.

23. The pod assembly of claim 22 wherein the passive pod further comprises a passive tubular member extending through the interior of the passive pod body and being coupled with the passive pod body.

24. The pod assembly of claim 23 further comprising an axle extending through at least a portion of the interior of the passive tubular member, the passive tubular member being rotatable relative to the axle and being generally fixed relative to the axle in an axial direction along the axis of the axle, the axle further extending through at least a portion of the interior of the thrust tubular member, the thrust tubular member being rotatable relative to the axle and being generally fixed relative to the axle in the axial direction.

25. The pod assembly of claim 23 wherein the passive pod further comprises at least one hub coupled with the passive pod body and the passive tubular member, the hub including at least one opening to permit gas flow therethrough.

26. The pod assembly of claim 25 wherein the passive pod comprises two hubs disposed inside the passive pod body and spaced from the front end and rear end of the passive pod body, the two hubs being spaced from one another.

27. The pod assembly of claim 22 wherein the passive pod further comprises a fluid line coupled to a fluid source for introducing a fluid between the interior of the thrust tube and the exterior of the passive pod tire.

28. The pod assembly of claim 22 wherein the passive pod tire includes at least one tread on the exterior surface of the passive pod tire, the at least one tread being slanted with respect to a longitudinal direction of movement of the passive pod for guiding the passive pod tire in rotation relative to the thrust tube when the passive pod tire moves inside the thrust tube.

29. A pod assembly configured to be disposed inside and thrusted along a slotted tube having a longitudinal slot, the pod assembly comprising a first pod; a second pod coupled with the first pod; and a strut disposed between the first pod and the second pod and coupled with the first pod and the second pod, the strut being configured to extend through the longitudinal slot of the slotted tube to the exterior of the slotted tube, wherein the first pod is a thrust pod comprising:
a thrust pod body including a generally cylindrical wall having a front end and a rear end, the thrust pod body being smaller in cross-section than the slotted tube, a portion of the front end being open and a portion of the rear end being open to allow gas flow through the thrust pod body between the front end and the rear end;
a thrust pod tire coupled with the generally cylindrical wall of the thrust pod body to define an outer annular enclosure between the thrust pod tire and the wall of the thrust pod body, the thrust pod tire being inflatable to make contact with the interior of the slotted tube and deflatable to open gas flow between the thrust pod body and the slotted tube; and
at least one bladder disposed inside the thrust pod body, the bladder being inflatable and deflatable to modulate gas flow through the thrust pod body to adjust speed of movement of the thrust pod body inside the slotted tube.

30. The pod assembly of claim 29 further comprising means for modulating gas flow through the first pod and the second pod to adjust speed of movement of the pod assembly inside the slotted tube.

31. The pod assembly of claim 29 wherein the strut includes conduits for guiding gas lines coupled from a gas source to the outer annular enclosure and the at least one bladder.

32. The pod assembly of claim 29 wherein the strut includes a conduit for accommodating a fluid line coupled from a fluid source to the exterior of the thrust pod for introducing fluid between the interior of the slotted tube and the exterior of the thrust pod tire.

33. A pod assembly configured to be disposed inside and thrusted along a slotted tube having a longitudinal slot, the pod assembly comprising a first pod; a second pod coupled with the first pod; and a strut disposed between the first pod and the second pod and coupled with the first pod and the second pod, the strut being configured to extend through the longitudinal slot of the slotted tube to the exterior of the slotted tube, wherein the second pod is a passive pod comprising:
a passive pod body including a generally cylindrical wall having a front end and a rear end, the passive pod body being smaller in cross-section than the slotted tube, a portion of the front end being open and a portion of the rear end being open to allow gas flow through the passive pod body between the front end and the rear end; and
a passive pod tire coupled with the generally cylindrical wall of the passive pod body to define an outer annular enclosure between the passive pod tire and the wall of the passive pod body, the passive pod tire being inflatable to make contact with the interior of the slotted tube and deflatable to open gas flow between the passive pod body and the slotted tube.

34. The pod assembly of claim 33 further comprising means for modulating gas flow through the first pod and the second pod to adjust speed of movement of the pod assembly inside the slotted tube.

35. A pod assembly configured to be disposed inside and thrusted along a slotted tube having a longitudinal slot, the pod assembly comprising a first pod; a second pod coupled with the first pod; and a strut disposed between the first pod and the second pod and coupled with the first pod and the second pod, the strut being configured to extend through the longitudinal slot of the slotted tube to the exterior of the slotted tube, further comprising an axle extending through at least a portion of the interior of the first pod and through at least a portion of the interior of the second pod, the first and second pod being generally coaxial with and rotatable relative to the axle and being generally fixed relative to the axle in an axial direction along the axis of the axle, wherein the strut is coupled with the axle.

36. A pod assembly configured to be disposed inside and thrusted along a slotted tube having a longitudinal slot, the pod assembly comprising a first pod; a second pod coupled with the first pod; and a strut disposed between the first pod and the second pod and coupled with the first pod and the second pod, the strut being configured to extend through the longitudinal slot of the slotted tube to the exterior of the slotted tube, further comprising means for introducing a fluid between the exterior surfaces of the first and second pods and the interior surface of the slotted tube.

37. A pod assembly configured to be disposed inside and thrusted along a slotted tube having a longitudinal slot, the pod assembly comprising a first pod; a second pod coupled with the first pod; and a strut disposed between the first pod and the second pod and coupled with the first pod and the second pod, the strut being configured to extend through the longitudinal slot of the slotted tube to the exterior of the slotted tube, further comprising a valve which is adjustable to modulate gas flow through the pod assembly to adjust speed of movement of the pod assembly inside the slotted tube between a maximum speed by minimizing gas flow through the first pod and the second pod and a minimum speed by maximizing gas flow through the first pod and the second pod.

38. The pod assembly of claim 37 wherein the valve comprises a split butterfly valve having a valve body which is rotatable by a push rod to modulate gas flow therethrough.

39. The pod assembly of claim 37 wherein the valve is disposed at least partly inside the strut.

40. The pod assembly of claim 37 wherein the first pod comprises a first pod body including a generally cylindrical wall having a front end and a rear end, the first pod body being smaller in cross-section than the slotted tube, a portion of the front end being open and a portion of the rear end being open to allow gas flow through the first pod body, the first pod body further including a first pod tire coupled with the generally cylindrical wall of the first pod body to define an outer annular enclosure between the first pod tire and the wall of the first pod body, the first pod tire being inflatable to make contact with the interior of the slotted tube and deflatable to open gas flow between the first pod body and the slotted tube.

41. The pod assembly of claim 40 wherein the second pod comprises a second pod body including a generally cylindrical wall having a front end and a rear end, the second pod body being smaller in cross-section than the slotted tube, a portion of the front end being open and a portion of the rear end being open to allow gas flow through the second pod body, the second pod body further including a second pod tire coupled with the generally cylindrical wall of the second pod body to define an outer annular enclosure between the second pod tire and the wall of the second pod body, the second pod tire being inflatable to make contact with the interior of the slotted tube and deflatable to open gas flow between the second pod body and the slotted tube.

42. The pod assembly of claim 41 wherein the rear end of first pod body and the front end of the second pod body are connected together in a connection region and the valve is disposed partly inside the first pod body and partly inside the second pod body in the connection region.

43. The pod assembly of claim 41 wherein the strut is generally fixed with the first pod body and the second pod body in the connection region.

44. The pod assembly of claim 41 wherein the outer annular cavity of the first pod includes a first fluid plenum configured to be coupled with a fluid source to receive a fluid, the first pod tire including at least one orifice for introducing the fluid from the first fluid plenum to a region between the exterior surface of the first pod tire and the interior surface of the slotted tube when the fluid inside the first fluid plenum has a pressure which exceeds a first pressure exerted on the first pod tire by the slotted tube, and wherein the outer annular cavity of the second pod includes a second fluid plenum configured to be coupled with a fluid source to receive a fluid, the second pod tire including at least one orifice for introducing the fluid from the second fluid plenum to a region between the exterior surface of the second pod tire and the interior surface of the slotted tube when the fluid inside the second fluid plenum has a pressure which exceeds a second pressure exerted on the second pod tire by the slotted tube.

45. The pod assembly of claim 41 wherein the first pod includes streamlined spokes disposed at least partly inside the first pod body and being coupled with the first pod body to support the first pod body, and wherein the second pod includes streamlined spokes disposed at least partly inside the second pod body and being coupled with the second pod body to support the second pod body.

46. A pod assembly configured to be disposed inside and thrusted along a thrust tube, the pod assembly comprising:

a pod body including a generally cylindrical wall having a front end and a rear end, the pod body being smaller in cross-section than the thrust tube, a portion of the front end being open and a portion of the rear end being open to allow gas flow through the pod body between the front end and the rear end;

at least one pod tire coupled with the generally cylindrical wall of the pod body to define an outer annular enclosure between the pod tire and the wall of the pod body, the pod tire being inflatable to make contact with the interior of the thrust tube and deflatable to open gas flow between the pod body and the thrust tube; and a valve disposed at least partly inside the pod body and being adjustable to modulate gas flow through the pod body to adjust speed of movement of the pod body inside the thrust tube.

47. The pod assembly of claim 46 wherein the at least one pod tire comprises a first pod tire coupled with a portion of the generally cylindrical wall of the pod body near the front end to define a first outer annular enclosure between the first pod tire and the wall of the pod body and a second pod tire coupled with another portion of the generally cylindrical wall of the pod body near the rear end to define a second outer annular enclosure between the second pod tire and the wall of the pod body.

48. The pod assembly of claim 46 further comprising a vacuum source coupled with a downstream side of the pod body.

49. The pod assembly of claim 46 further comprising a pressure source coupled with an upstream side of the pod body.

* * * * *